(12) United States Patent
Cheynet et al.

(10) Patent No.: US 6,621,004 B2
(45) Date of Patent: Sep. 16, 2003

(54) PROTECTIVE CASING FOR A DISPLAY SCREEN AND A METHOD AND TOOL FOR MANUFACTURING SUCH A CASING

(75) Inventors: Joseph Cheynet, Bazouges (FR); Anthony Andre Clovis Grandbert, Allonnes (FR); Laurent Mozer, Antibes (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/142,589

(22) Filed: May 9, 2002

(65) Prior Publication Data

US 2003/0015336 A1 Jan. 23, 2003

(30) Foreign Application Priority Data

May 10, 2001 (FR) .............................. 01 06199

(51) Int. Cl.[7] ................................. H05K 5/00
(52) U.S. Cl. .................. 174/50; 206/521; 379/440; 349/58
(58) Field of Search ................. 174/50; 206/521; 379/440; 349/58

(56) References Cited

U.S. PATENT DOCUMENTS

| 4,450,963 A | * | 5/1984 | Sieber ..................... 206/521 |
|---|---|---|---|
| 5,024,167 A | * | 6/1991 | Hayward ................ 108/50.02 |
| 5,246,516 A | * | 9/1993 | Rias ........................... 156/202 |
| 5,251,329 A | * | 10/1993 | Takagi et al. ............... 455/572 |
| 5,546,457 A | * | 8/1996 | Tomura et al. ............. 379/368 |
| 5,905,550 A | * | 5/1999 | Ohgami et al. ............... 349/58 |
| 5,975,935 A | * | 11/1999 | Yamaguchi et al. ........ 439/374 |
| 6,056,511 A | * | 5/2000 | Kennedy et al. ............. 417/53 |

* cited by examiner

Primary Examiner—Dean A. Reichard
Assistant Examiner—Anton Harris
(74) Attorney, Agent, or Firm—Jack D. Slobod

(57) ABSTRACT

The invention proposes a protective casing (12) for an electronic appliance (10) of the type which has a shell (18) in which there is produced an opening (20) closed off by a body (22) made from transparent material with a general flat shape, of the type in which at least one internal peripheral annular fixing area (30) of the transparent body (22) is fixed to a facing area (32) of the periphery of the opening (20) by fixing and/or positioning means (34) with the interposing of a first decorative cladding (38) between the peripheral fixing area (30) of the transparent body (22) and the fixing and/or position means (34), characterized in that the peripheral fixing area (30) is inclined with respect to the overall plane of the transparent body (22).

The invention also proposes a method and tool for manufacturing such a casing.

9 Claims, 5 Drawing Sheets

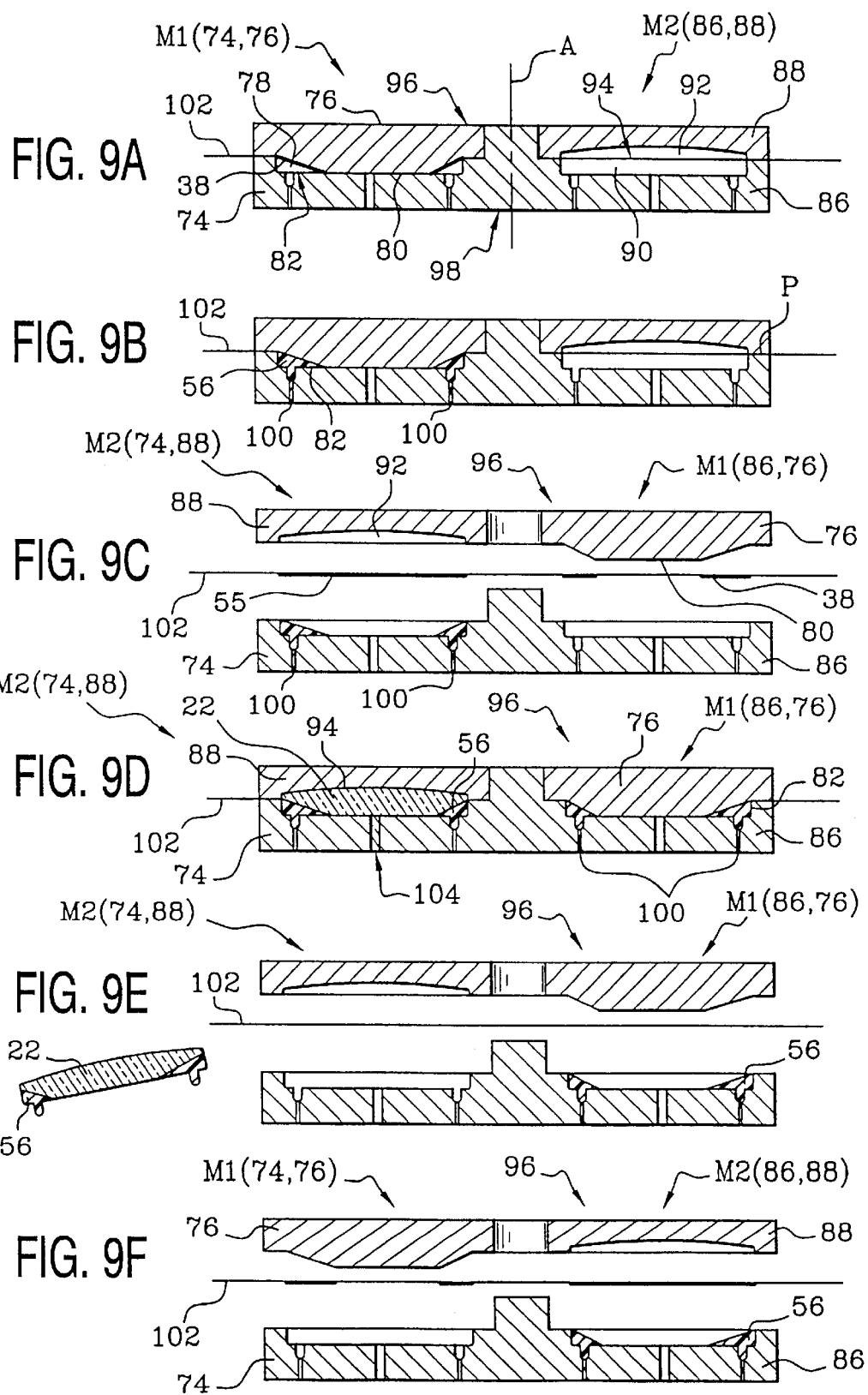

PROTECTIVE CASING FOR A DISPLAY SCREEN AND A METHOD AND TOOL FOR MANUFACTURING SUCH A CASING

The invention proposes a protective casing for an electronic appliance.

The invention proposes more particularly a protective casing for an electronic appliance of the type which has a shell in which there is produced an opening closed off by a body made from transparent material with a generally flat shape.

The invention also proposes an electronic appliance having such a casing.

Such protective casings are for example used for mobile telephones of the GSM type.

The protective casing naturally protects the components of the electronic appliance such as a keypad and switches whose activation modifies the electrical state of a control circuit. In the case of a mobile telephone, the protective casing must in particular also protect a display screen which provides the interface between the appliance and the user.

To do this, the casing generally has an opening or window closed off by a body made from transparent material with a generally flat shape. The display screen is then arranged inside the casing opposite the opening.

In some cases, the body made from transparent material has special optical properties such as a magnifying effect which then improves the legibility of the information displayed on the display screen.

The body made from transparent material must be sufficiently strong to protect the display screen against impacts or scratches which may be due to rubbing of the electronic appliance against other objects, for example metallic keys, when it is placed inside a purse.

Thus the dimensions of the body made from transparent material, in particular its thickness, as well as its characteristics, in particular the hardness of its external face, are determined so as to resist impacts and scratches.

To do this, it is known that a body made from plastics material can be used, whose thickness is around 2 to 5 mm and whose external face is covered with an anti-scratch protective cladding which increases the surface hardness of the external face of the body.

The fixing of the transparent body to the casing is generally carried out by adhesive bonding of a peripheral area of the transparent body, which is oriented towards the inside of the casing, on a peripheral area of the opening which is advantageously situated inside the casing so that the external face of the casing and the external face of the transparent body are substantially aligned or flush.

In this case, glue is visible from the outside of the casing through the plastic body. This is detrimental to the aesthetic appearance of the telephone.

So as to conceal the glue, a decorative cladding can be placed on the external face of the body made from transparent material before this face is covered with the protective cladding.

However, when the protective cladding is not sufficiently strong to protect the body made from transparent material, the decorative cladding may be scratched.

The distance which separates the display screen and the decorative cladding, which is around several millimeters, causes an impression of distancing of the screen towards the inside of the casing. This impression is detrimental to the overall appearance of the electronic appliance.

In addition, when light external to the casing illuminates the latter in a direction which is not perpendicular to the overall plane of the body made from transparent material, the protective cladding causes the formation of shadows on the screen, which interfere with the reading of the information supplied by the screen.

To remedy these problems, it is known that the decorative cladding can be interposed between the fixing area of the transparent body and the fixing glue.

However, it is not possible to concomitantly place the protective cladding and the decorative cladding on their respective areas situated on opposite faces of the transparent screen.

So that the decorative cladding provides a positive aesthetic effect, it must be placed on a flat surface. However, the surface evenness of the internal face of the transparent body is not always sufficient. This causes irregularities in the cladding which are visible to the user.

When the thickness of the transparent body is around a few millimeters, the user can see through the side faces of the body, which is detrimental to the overall appearance of the electronic appliance.

In order to resolve these problems, the invention proposes a protective casing for an electronic appliance of the type which has a shell in which there is produced an opening closed off by a body made from transparent material with a generally flat shape, of the type in which at least one internal peripheral annular area for fixing the transparent body is fixed to an area opposite the periphery of the opening by fixing and/or positioning means with the interposing of a first decorative cladding between the peripheral area for fixing the transparent body and the fixing and/or positioning means, characterized in that the peripheral fixing area is inclined with respect to the overall plane of the transparent body.

According to other characteristics of the invention:

- the inclined peripheral fixing area extends over the whole of the periphery of the transparent body;
- the substantially flat external face of the transparent body is coated at least partially with a second cladding, notably a protective cladding, for example non-scratch, for the external face of the transparent body;
- the fixing and/or positioning means include a layer of glue;
- the fixing and/or positioning means include at least one insert, and the first cladding at least partially masks the insert;
- the angle of inclination of the peripheral fixing area is around 30° with respect to the overall plane of the transparent body.

The invention also proposes a method of manufacturing a protective casing of the type described previously, characterized in that: the insert is produced by molding a first material in a first cavity delimited by the impressions of two matrices of a first mold; then the insert is transferred into a second cavity, delimited by the impressions of two matrices of a second mold, into which a second transparent material is injected so as to produce the transparent body by molding the second material on the insert.

According to other characteristics of the method:

- when the insert is being produced, the first decorative cladding is deposited on the area of the insert complementary to the peripheral fixing area of the transparent body, by transferring the first decorative cladding which belongs to a film which extends in the cavity of the first mold;
- when the transparent body is molded, the second cladding is deposited on at least part of the external face of the body by transfer of the second cladding which belongs to a film which extends in the cavity of the second mold.

The invention also proposes a tool for manufacturing a protective casing of the type which has:

a first mold consisting of a first bottom matrix and a first top matrix each having an impression so as to delimit a first cavity in which the insert is produced, and a second mold consisting of a second bottom matrix and a second top matrix each having an impression so as to delimit a second cavity into which the insert on which the transparent body is molded is transferred, characterized in that the first bottom matrix and the second bottom matrix each have an identical impression.

According to other characteristics of the tool:

the first and second bottom matrices are able to move with respect to the first and second top matrices;

the first and second top matrices are produced as a common top matrix having two impressions, the first and second bottom matrices are produced as a common bottom matrix having two impressions and in that a common matrix is mounted so as to pivot about an axis orthogonal to the parting plane of the molds so that its pivoting through 180° allows the alternating cooperation of each of these two impressions with each of the impressions of the other two matrices.

The invention will be further described with reference to examples of embodiment shown in the drawings to which however the invention is not restricted:

FIGS. 9A to 9F are views in section of the tool depicted in the previous figure which illustrates the successive steps of the method of manufacturing the protective casing produced according to the invention.

In the following description the identical or similar elements will be designated by the same reference figures. A terminology horizontal, vertical, top and bottom will be adapted, non-limitatively, with reference to the figures.

Figure 1:
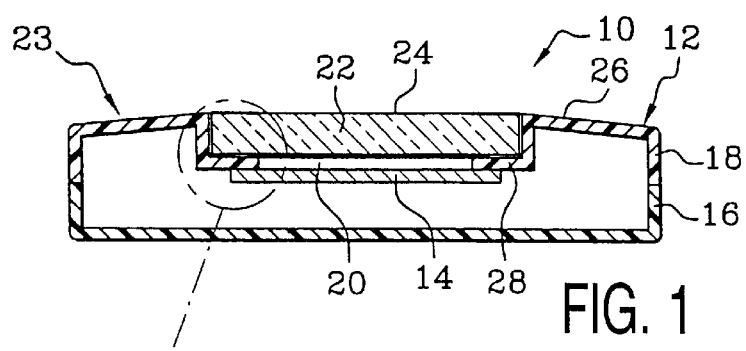
FIG. 1 is a schematic view in transverse section of a protective casing according to a first embodiment of the state of the art.

FIGS. 1 to 4 depict two examples of embodiment according to the state of the art of an electronic appliance 10, which is here for example a mobile telephone of the GSM type. The telephone 10 has a protective casing 12 in which there are arranged the components which enable the telephone to function. Amongst these elements only a display screen 14 is shown.

So as to facilitate an understanding of the description, an internal and external orientation will be used with respect to the inside and outside of the protective casing 12, respectively.

To facilitate the assembly of the components, the protective casing 12 has a bottom shell 16 and a top shell 18 which are distinct. Thus the elements are mounted therein since the two shells are connected together so as to close the casing 12.

The top shell 18 has an opening or window 20 which is closed off by a body made from transparent material 22 with a generally flat shape. The opening 20 is produced in the substantially horizontally oriented front or main face 23 of the telephone 10.

So as to provide the esthetic unity of the telephone 10, the external face 24 of the body made from transparent material 22 is in line with the external face 26 of the top shell 18.

The periphery of the opening 20 has a stepped rim 28 which extends inside the casing 12 and which receives the body made from transparent material 22.

The fixing of the body 22 to the top shell 18 is obtained by fixing means 34.

Here the fixing of the body 22 on the shell 18 is obtained by gluing the internal and bottom peripheral annular fixing area 30 of the body 22 to a facing top area 32 of the rim 28 of the periphery of the opening 20.

Thus a layer of glue 35 is deposited between the annular area 30 of the body made from transparent material 22 and the fixing area 32 of the top shell 18.

So as to mask the fixing means 34, a peripheral annular area 36 of the external face 24 of the body 22 is covered with a first decorative cladding 38. Thus, when the user looks at the main face 23 of the telephone 10, the first decorative cladding 38 masks the rim 28 and the layer of glue 35.

However, such a design has drawbacks already cited.

These are in particular the impression of distancing of the screen 14 towards the inside of the casing 12 and the formation of shadows on the display screen 14.

This is because, when the light external to the casing 12 illuminates the latter in a direction which is not perpendicular to the overall plane of the main face 23 of the casing 12, notably to the external face 24 of the body 22 made from transparent material, the decorative cladding 38 forms shadows on the screen which interfere with the reading of the information which it supplies.

Figure 2:
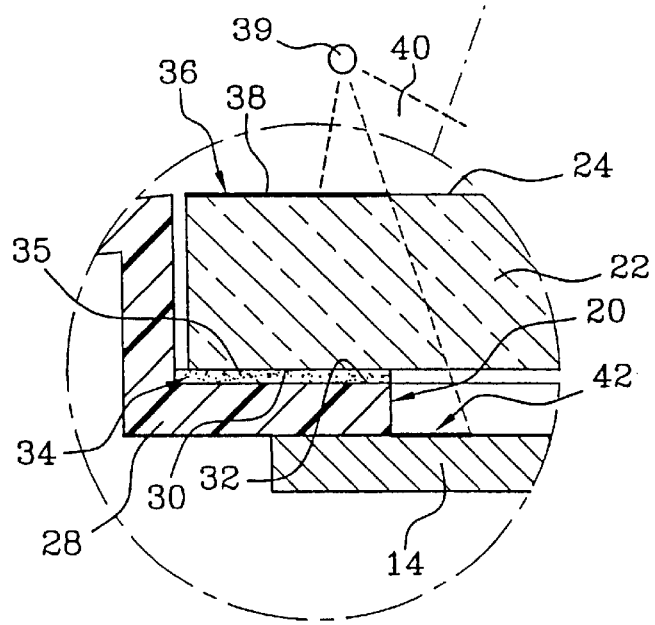
FIG. 2 depicts to a large scale a detail of the previous figure.

FIG. 2 shows this phenomenon. A light source 39 emits a beam of light 40 which is inclined with respect to the external face 24 of the body 22. Some of the light beam 40 is blocked by the decorative cladding 38 and a shadow area 42 is formed on the display screen 14 of the telephone.

Figure 3:
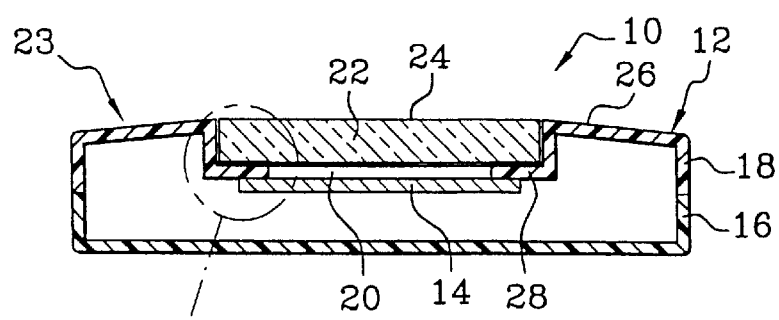
FIG. 3 is a view in transverse section of a protective casing according to a second embodiment of the state of the art.
Figure 4:
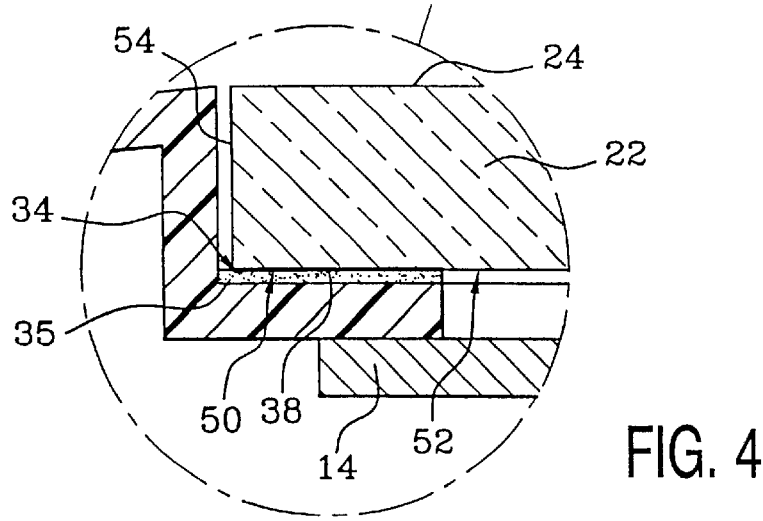
FIG. 4 depicts to a large scale a detail of the previous figure.

According to a second example of embodiment, it is also known, in accordance with FIGS. 3 and 4, that the first decorative cladding 38 covers a peripheral area 50 of the internal bottom face 52 of the body 22.

Thus the layer of glue 35 which is interposed between the first decorative cladding 38 and the rim 28 is not visible from the outside of the telephone 10.

However, when the body 22 is thick, the user can "see" through its lateral faces 54, which is detrimental to the esthetic appearance of the telephone 12.

In addition, the distance between the external face 24 of the body 22 and the first decorative cladding 38 gives an impression of distancing of the first decorative cladding 38 and of the display screen 12, which is detrimental to the overall appearance of the telephone 10.

It is therefore preferable to limit the thickness of the body 22.

However, a reduction in the thickness does not enable the body to withstand all the impacts to which it may be subjected. Consequently it is necessary to find a compromise which makes it possible to preserve the esthetic appearance of the telephone 10 and which enables the body 22 to resist impacts to the maximum possible extent.

So as to provide a solution to these problems, the invention proposes that the peripheral fixing area 30 be inclined with respect to the overall plane of the transparent body 22, notably with respect to its external face 24.

The angle of inclination of the peripheral fixing area 30 with respect to the substantially horizontal overall plane of the transparent body 22 can for example be between 15 and 30 degrees.

Thus, whatever the thickness of the body 22 made from transparent material, the inclined peripheral fixing area 30 eliminates the impression of depth of the display screen 14 inside the casing 12.

Figure 5:
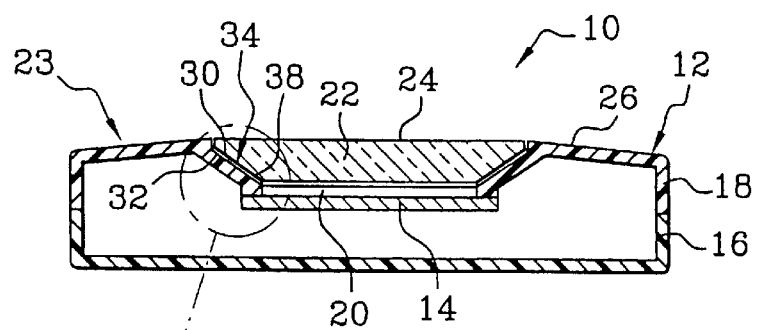
FIG. 5 is a view in transverse section of a protective casing according to a first embodiment of the invention.
Figure 6:
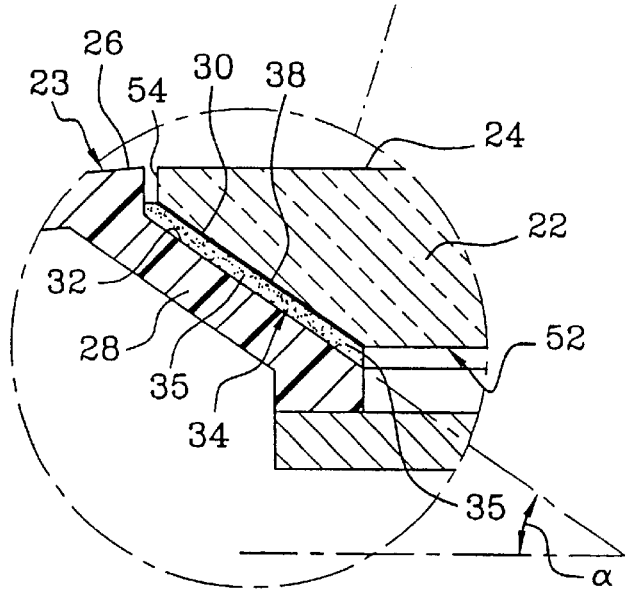
FIG. 6 depicts to a large scale a detail of the previous figure.

According to a first embodiment of the invention depicted in FIGS. 5 and 6, the rim 28 of the top shell 18 is inclined by an angle identical to that of the peripheral fixing area 30.

In accordance with the state of the art, the body 22 made from transparent material is fixed to the top shell 18 by fixing means 34 which include for example a layer of glue 35 with the interposing of a first decorative cladding 38 so as to mask the layer of glue 35 from the outside.

Advantageously, the inclined peripheral fixing area 30 is annular and extends over the entire periphery, for example rectangular with rounded corners, of the body 22 made from transparent material. This ensure the esthetic unity of the body 22 and of the telephone 10.

The first decorative cladding 38 extends substantially from the external face 26 of the top shell 18 as far as the display screen 14 so as to give an impression of continuity between the main face 23 of the telephone 10 and the display screen 14, which improves the esthetic appearance of the telephone 10.

In addition, as can be seen by comparing FIGS. 4 and 6, the side faces 54 of the body 22 are very small. Thus the user of the appliance cannot see the rim 28 of the top part of the shell 18 through the body 22. This improves the esthetic appearance of the telephone 10 still further.

Advantageously, according to a variant which is not shown, the peripheral fixing area 30 extends from the internal face 52 as far as the external face 24 of the body 22 so as to eliminate the side faces 54 and reinforce the impression of continuity between the main face of the telephone 10 and the display screen 14.

Such a design eliminates any risk of formation of shadows on the display screen 14, whatever the angle of incidence of the light with respect to the main face 23 of the telephone 10.

In addition, the first decorative cladding 38 being situated between the body 22 made from transparent material and the rim 28 of the top shell 18, it is perfectly protected and under no circumstances is there a risk of being damaged by external attacks such as rubbing of the main face 23 against other objects.

Figure 7:
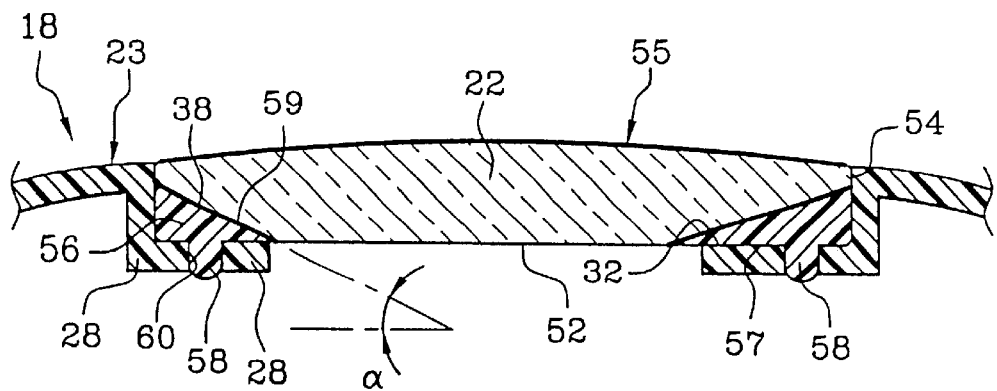
FIG. 7 is a view in transverse section to a larger scale of part of a protective casing according to a second embodiment of the invention.

The external face 24 of the body 22 can be covered with a second cladding 55 (FIG. 7).

The second cladding 55 can be a non-scratch cladding which protects the external face against any scratches which may be caused by the telephone 10 rubbing on other objects.

So as to facilitate the display of information on the screen 14 under all circumstances, whatever the angle of incidence of the light with respect to the external face 24 of the body 22, the second cladding 55 can be a non-reflective cladding.

FIG. 7 depicts a second preferred embodiment of the invention.

The protective casing 12 consists of a transparent body 22 whose means of fixing 34 with the top shell 18 include an insert 56 which is advantageously of annular shape.

The insert has a shape complementary to that of the stepped rim 28. It is delimited by a horizontal bottom face 57 which is in abutment on the area 32 of the rim 28, and by a top face 59 inclined by the angle in accordance with the invention. The insert 56 is thus interposed vertically between the rim 28 and the screen 22.

The insert 56 is masked towards the outside by the first decorative cladding 38 which extends opposite its inclined top face 59.

The insert 56 has studs 58 which extend substantially vertically towards the inside of the casing 12 and which cooperate with orifices 60 produced in the rim 28 of the top shell 18.

The studs 58 make it possible to position and fix the body 22 with respect to the top shell 18.

The studs 58 can be glued inside the orifices 60 so as to fix the body 22 to the top shell 18.

According to a variant, the studs 58 can be forcibly engaged in the orifices 60, or crimped hot.

The invention also proposes a tool 70 for manufacturing the protective casing 12 according to the second embodiment, with insert, of the invention. The tool 70 in particular makes it possible to effect the molding of the insert 56 and the overmolding of the body 22 made from transparent material, with the interposing of the first cladding 38.

The tool 70 depicted in FIGS. 8 and 9A to 9F includes two molds.

Figure 8:
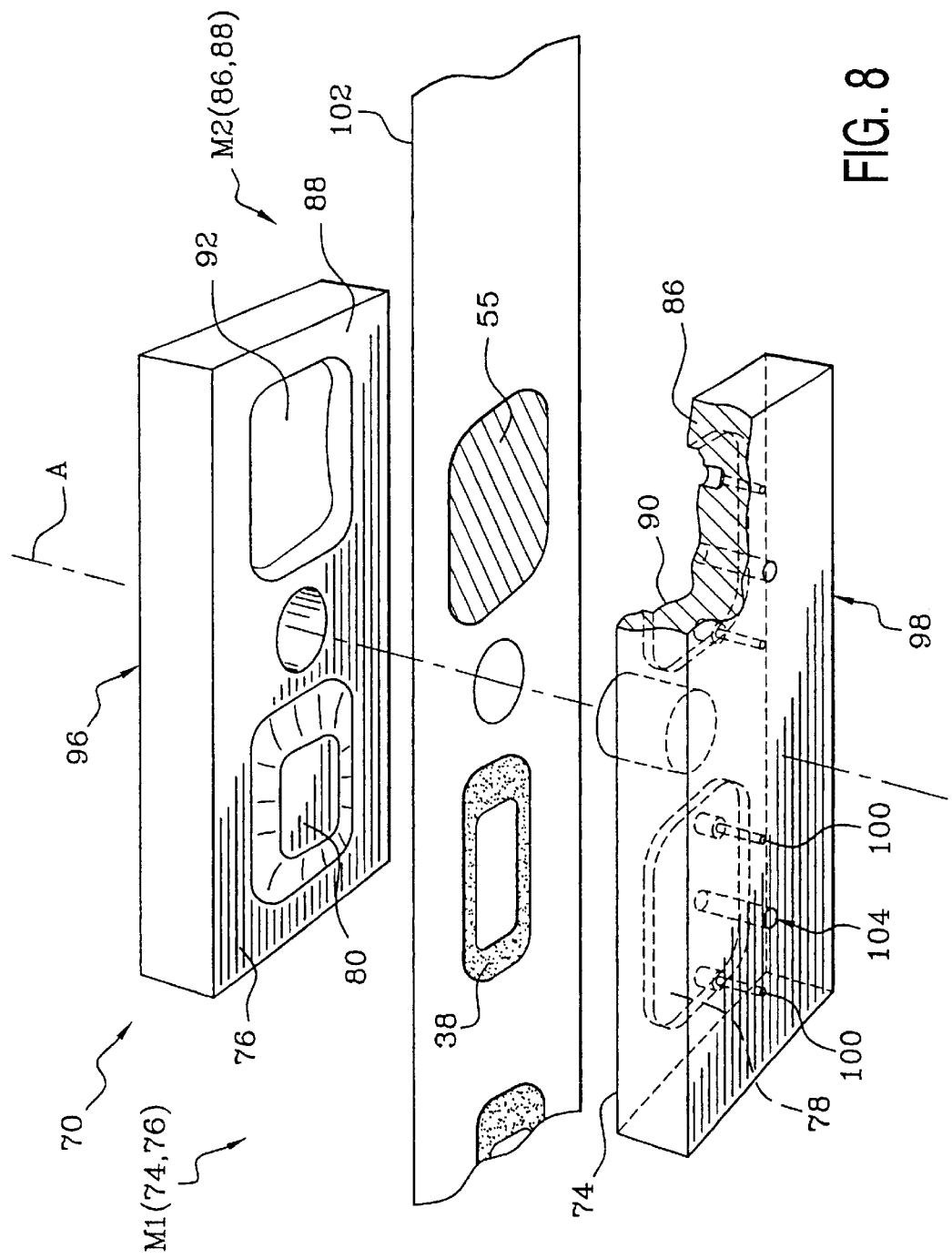
FIG. 8 is a schematic perspective view of a tool for manufacturing a protective casing according to the invention.

In accordance in particular with FIGS. 8, 9A and 9B, a first mold M1 consists of a first bottom matrix 74 and a first top matrix 76 each having an impression 78 and 80 respectively, so as to delimit a first cavity 82 in which the insert 56 is produced by molding.

The first mold M1 is then designated in the figures by the reference M1(X,Y) in which X and Y correspond to the reference of the corresponding top and bottom matrices respectively.

In accordance in particular with FIGS. 8, 9A and 9B, a second mold M2 consists of a second bottom matrix 86 and a second top matrix 88 each having an impression 90, 92 respectively so as to delimit a second cavity 94 into which the insert 56 is transferred and on which the transparent body 22 is molded.

In a similar fashion to the first mold M1, the second mold M2 is then designated in the figures by the reference M2(X, Y) in which X and Y correspond to the reference of the corresponding top and bottom matrices respectively.

In accordance with the invention, the first bottom matrix 74 and the second bottom matrix 86 each have identical impressions 78 and 90.

In addition, the first and second bottom matrices 74 and 86 are able to move with respect to the first and second top matrices 76 and 88.

Advantageously, in accordance with FIGS. 8 and 9A to 9F the first and second top matrices 76 and 88 are produced in the form of a common top matrix 96 having two impressions 80 and 92. Likewise the first and second bottom matrices 74 and 86 are produced in the form of a common bottom matrix 98 including the two impressions 78 and 90.

The common top matrix 96 is mounted so as to pivot about a vertical axis A orthogonal to the horizontal parting line P of the molds so that its pivoting through 180° allows the alternating cooperation of each of the two impressions 80 and 92 with each of the two impressions 78 and 90 in the other two matrices 74 and 86 respectively.

The use of the tool 70 will be explained by the description of the method of manufacturing the protective casing 12 according to the second embodiment.

According to this method, the insert 56 is produced by molding from a first material in a first cavity 82, delimited by the impressions 78 and 80 in the two matrices 74 and 76 of the first mold M1.

At the start of the production process, the first and second cavities 82 and 94 in the first and second molds M1 and M2 are empty in accordance with FIG. 9A. In accordance with FIG. 9B, a first plastics material is injected into the first cavity 82 through the channels 100 which pass through the first bottom matrix 74 so as to produce the insert 56.

Advantageously, when the insert 56 is produced, the first decorative cladding 38 is deposited on the area of the insert associated with the peripheral fixing area 30 of the transparent body 22.

The deposition of the first cladding 38 is produced by transfer using a film 102 which extends in the cavity 82 of the first mold M1.

The film 102 can be made from heat-resistant plastic. The first cladding 38 is deposited on the face of the film 102 which is oriented downwards towards the first bottom matrix 74 when the insert 56 is produced.

The adhesion between the first cladding 38 and the film 102 is such that, when the first hot plastics material is injected into the first cavity 82, the heat causes the detachment of the first cladding 38 from the film 102. Thus the first cladding 38 is "deposited" on the part of the insert 56 with which it is in contact.

Next the common top matrix 96 is shifted upwards so as to open the molds M1 and M2 and then pivots through 180° about the axis A, in accordance with FIG. 9C.

The first mold M1 then consists of the first bottom matrix 74 and the second top matrix 88 and the second mold M2 consists of the second bottom matrix 86 and the first top matrix 76.

The film 102 is translated horizontally so that the first decorative cladding 38 is opposite the impression 80 in the first top matrix 76, and so that a second cladding 55, for example the non-scratch protective cladding 55, is opposite the impression 92 in the second top matrix 88.

The common top matrix 96 is then shifted downwards so as to close the molds M1 and M2.

The first top matrix 76 is then opposite the second bottom matrix 86 so as to form the first cavity 82, and the second top matrix 88 is opposite the first bottom matrix 74 so as to form the second cavity 94, in accordance with FIG. 9D.

When the molds M1 and M2 are closed, the first plastics material is injected through the channels 100 in the second bottom matrix 86 into the first cavity 82 so as to produce the insert 56.

Concomitantly, transparent plastics material is injected through the central channel 104 in the first bottom matrix 74 into the second cavity 94 so as to mold the body 22 made from transparent material onto the insert 56 produced at the previous step. During this step, the decorative 38 and protective claddings deposited on the film 102 are transferred onto corresponding areas of the insert 56 and of the body 22 respectively.

Thus the method makes it possible to produce concomitantly an insert 56 and to mold the body 22 onto an insert 56 produced at the previous step.

FIG. 9E depicts the opening in the first and second molds M1 and M2, and the ejection of the body 22 molded onto the insert 56.

Next, in accordance with FIG. 9F, the common top matrix 96 once again pivots through 180° into a position identical to that depicted in FIG. 9A.

The method continues, thus making it possible, each time the molds M1 and M2 are opened, to produce an insert 56 and to mold a body 22 onto the insert 56 already produced.

So as to easily translate the film 102 each time the molds M1 and M2 are opened, it can be wound on two reels, not shown, situated on each side of the tool 70.

One of them, by unwinding, supplies the tool 70 with claddings. The other stores the film 102 by rewinding it.

What is claimed is:

1. A protective casing (12) for an electronic appliance (10) of the type which has a shell (18) in which there is produced an opening (20) closed off by a body (22) made of transparent material with a general flat shape, of the type in which at least one internal peripheral annular area (30) for fixing the transparent body (22) is fixed to an opposite area (32) of the periphery of the opening (20) by fixing and/or positioning means (34) with the interposing of a first decorative cladding (38) between the peripheral area (30) for fixing the transparent body (22) and the fixing and/or positioning means (34), characterized in that the peripheral fixing area (30) is inclined with respect to the overall plane of the transparent body (22).

2. A protective casing (12) as claimed in claim 1, characterized in that the inclined peripheral fixing area (30) extends over the entire periphery of the transparent body (22).

3. A protective casing (12) as claimed in claim 1, characterized in that the substantially flat external face (24) of the transparent body (22) is at least partially clad with a second cladding (55), notably a protective cladding, for example non-scratch, for the external face (24) of the transparent body (22).

4. A protective casing (12) as claimed in claim 1, characterized in that the fixing and/or positioning means (34) include a layer of glue (35).

5. A protective casing (12) as claimed in claim 1, characterized in that the fixing and/or positioning means (34) include at least one insert (56), and in that the first cladding (38) at least partially masks the insert (56).

6. A protective casing (12) as claimed in claim 1, characterized in that the angle of inclination of the peripheral fixing area (30) is around 30° with respect to the overall plane of the transparent body (22).

7. An electronic appliance having a casing as claimed in claim 1.

8. A protective casing (12) for an electronic appliance (10), comprising:
   a bottom shell (16);
   a top shell (18) including an opening (20) and a fixing area (32) adjacent said opening (20);
   a display screen (14) disposed between said bottom shell (16) and said top shell (18), said display screen (14) viewable through said opening (20);
   a transparent body (22) including a surface area (30) inclined with respect to an overall plane of said transparent body (22), said surface area (30) being affixed to said fixing area (32) to close said opening (20);
   an insert (56) affixing said inclined surface area (30) to said fixing area (32), said insert (56) being inclined with respect to an overall plane of said fixing area (32), wherein said fixing area (32) includes an orifice (60), and said insert (56) includes a stud extending through said orifice (60); and
   a decorative cladding (38) disposed between said inclined surface area (30) and said insert (56).

9. The protective casing (12) as claimed in claim 8, wherein said inclined surface area (30) extends over an entire periphery of said transparent body (22).

* * * * *